United States Patent
Hartz et al.

[11] Patent Number: 5,210,420
[45] Date of Patent: May 11, 1993

[54] POSITRON EMISSION TOMOGRAPHY SCANNER

[75] Inventors: Ross K. Hartz; Richard E. Hitchens, both of Houston; David G. Bristow, Sugar Land; Howard D. Yingst, Houston, all of Tex.

[73] Assignee: Positron Corporation, Houston, Tex.

[21] Appl. No.: 811,282

[22] Filed: Dec. 19, 1991

[51] Int. Cl.⁵ .......................... G01T 1/20; G01T 1/202
[52] U.S. Cl. .......................... 250/363.03; 250/363.04; 250/367; 250/368
[58] Field of Search ...................... 250/368.03, 363.04, 250/366, 367, 368, 370.11

[56] References Cited

U.S. PATENT DOCUMENTS

| | | | |
|---|---|---|---|
| 4,563,582 | 1/1986 | Mullani | 250/363.03 |
| 4,642,464 | 2/1987 | Mullani | 250/363.03 |
| 4,743,764 | 5/1988 | Casey et al. | 250/363.03 |
| 4,864,138 | 9/1989 | Mullani | 250/363.03 |
| 5,032,728 | 7/1991 | Chang et al. | 250/367 X |
| 5,091,650 | 2/1992 | Uchida et al. | 250/368 X |

FOREIGN PATENT DOCUMENTS

| | | | |
|---|---|---|---|
| 61-83986 | 4/1986 | Japan | 250/367 |
| 62-5190 | 1/1987 | Japan | 250/363.04 |
| 63-9881 | 1/1988 | Japan | 250/367 |
| 64-59188 | 3/1989 | Japan | 250/367 |
| 7906162 | 2/1981 | Netherlands | 250/367 |

OTHER PUBLICATIONS

Derenzo, "Initial Characterization of a BGO-Photodiode Detector for High Resolution Positron Emission Tomography", IEEE Transactions on Nuclear Science, vol. NS-31, No. 1, 1984, pp. 620-626.

Yamamoto et al., "A BGO Detector Using a New Encoding Scheme for a High Resolution Positron Emission Tomograph", Nuc. Inst. and Methods in Physics Research, A248, 1986, pp. 557-561.

*Primary Examiner*—Constantine Hannaher
*Assistant Examiner*—Edward J. Glick
*Attorney, Agent, or Firm*—Fulbright & Jaworski

[57] ABSTRACT

A positron emission tomography scanner having a plurality of detector rings positioned side-by-side. Each detector plane contains a plurality of photomultiplier tubes with at least two columns of scintillation crystals positioned on each photomultiplier tube defining a module in ring. Each crystal is uniform and has a length in the axial direction less than the size of the photomultiplier tube. The fundamental crystal identification module is limited to two photomultiplier tubes. Each alternate module in the ring is offset by one-half or less of the center-to-center intra-module crystal spacing in the axial direction.

4 Claims, 4 Drawing Sheets

POSITRON EMISSION TOMOGRAPHY SCANNER

BACKGROUND OF THE INVENTION

It is known, as disclosed in U.S. Pat. Nos. 4,563,582 and 4,642,464 how one may provide a positron emission tomography (PET) scanner having a plurality of rows of scintillation crystals offset from each other on each photomultiplier tube. However, the length of the crystals in the axial direction was the same as the size of the photomultiplier tube in the axial direction. Because of this length restriction on the crystals, the axial resolution of the scanner was limited. In order to improve the axial resolution, a smaller crystal size in the axial direction is desirable. Of course, the same configuration shown in the above named patents could be used with smaller size photomultiplier tubes. However, this would greatly increase the cost and complexity of the scanner. As disclosed in U.S. Pat. No. 4,864,138, the axial dimension of the crystals could be reduced, yet the design employs irregular crystal shapes which taken in combination serve to mix the light between the set of photomultiplier tubes to provide crystal identification. However, the use of crystals of non-uniform shape and mass produces a system with inconsistent slice and angular sensitivities.

The present invention is directed to various improvements in a PET scanner by reducing the axial resolution using a uniform crystal size and shape, providing more measuring slices without adding any more photomultiplier tubes, reducing the size of the fundamental crystal identification area to that covered by two photomultiplier tubes, thereby enhancing the count rate performance of the system, and offsetting in the axial direction alternate modules in ring rather than offsetting alternate crystals within a module, in order to obtain axial sampling that is less than one-half the axial resolution.

SUMMARY

One of the features of the present invention is the provision of scintillation crystals having an axial length which is less than the size of a photomultiplier tube thereby providing higher axial resolution and more measuring slices of the patient area without increasing the number of photomultiplier tubes.

By using crystals which have a length less than the photomultiplier tubes, the problem of crystal identification, that is, which crystal is activated by radiation, is more complex. Another feature of the present invention is the provision of a novel one-dimensional light guide which mixes the light from each crystal within a single column of crystals aligned between two photomultiplier tubes such that each crystal is identifiable within an energy map which represents relative signal levels between the two photomultiplier tubes. Further, an equal but opposite light guide is employed for a second column of crystals, adjacent to the first column, such that the energy distribution of each crystal interleaves with that obtained from the crystals in the first column. Therefore, each crystal in both columns is uniquely identifiable by its relative light/energy distribution between the two photomultiplier tubes. This feature can be extended to include a plurality of crystal columns aligned between two photomultiplier tubes using a related plurality of one-dimensional light guides to mix the light from each crystal to uniquely identify each crystal.

Another feature of the present invention is the reduction in fundamental crystal identification area to that area serviced by two photomultiplier tubes. However, in order to cover the desired axial field-of-view, a major module within a system will contain several such sub-modules aligned adjacent to each other in the axial direction with the line between the two photomultiplier tubes also oriented in the axial direction. This feature reduces the influence of dead-time from any particular crystal identification area and accordingly increases the number of crystal identification areas in the system. As a result, the count rate performance of the system is improved.

An additional object of the present invention is to achieve sampling in the axial direction which is less than one-half the axial resolution, without having to offset (or stagger) the columns of crystals that are associated with the minimal set of photomultiplier tubes within a sub-module. This is achieved by staggering each alternate major module in the axial direction by one-half or less of the intra-module axial spacing between crystal centers. The basic two photomultiplier tube detection unit or sub-module is connected to two or more non-staggered columns of crystals of uniform size and shape.

Other and further objects, features and advantages will be apparent from the following description of a presently preferred embodiment of the invention, given for the purpose of disclosure and taken in conjunction with the accompanying drawings.

BRIEF DESCRIPTION OF THE PREFERRED EMBODIMENT

Figure 1:
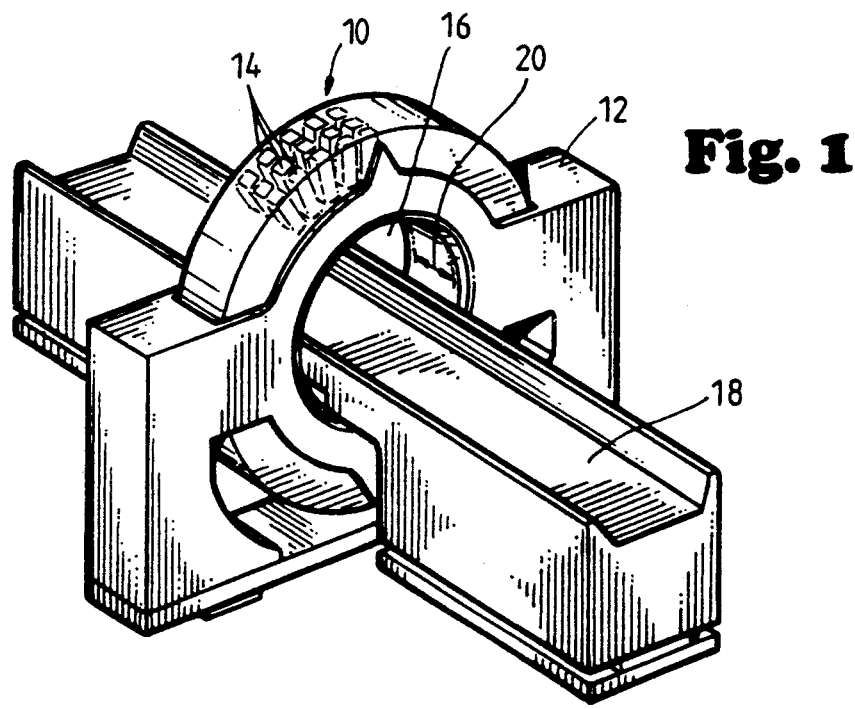
FIG. 1 is a perspective elevational view of the positron emission tomography scanner of the present invention.

Referring now to the drawings, and particularly to FIG. 1, the reference number 10 indicates a positron emission tomography scanner having a support gantry 12, a plurality of detection planes 14, here shown as three detector rings merely for ease of illustration, positioned side-by-side around and surrounding a patient area 16 to detect radiation therefrom. The patient area 16 covering an axial field-of-view 20, may include a patient bed 18 for supporting a patient who has been injected with a radiopharmaceutical such as Rubidium-82.

Figure 2:
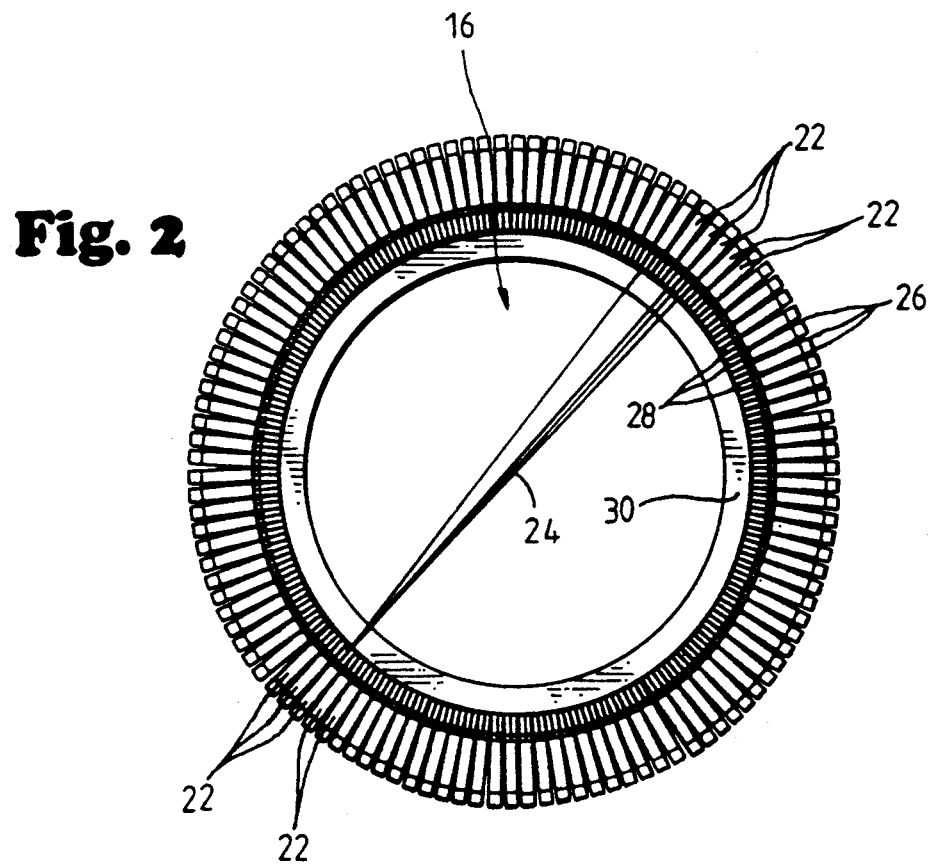
FIG. 2 is a cross-sectional view of the placement of one detector plane within the preferred embodiment of the present invention which includes a plurality of photomultiplier tubes, light guides and crystals, as well as one septum.
Figure 3:
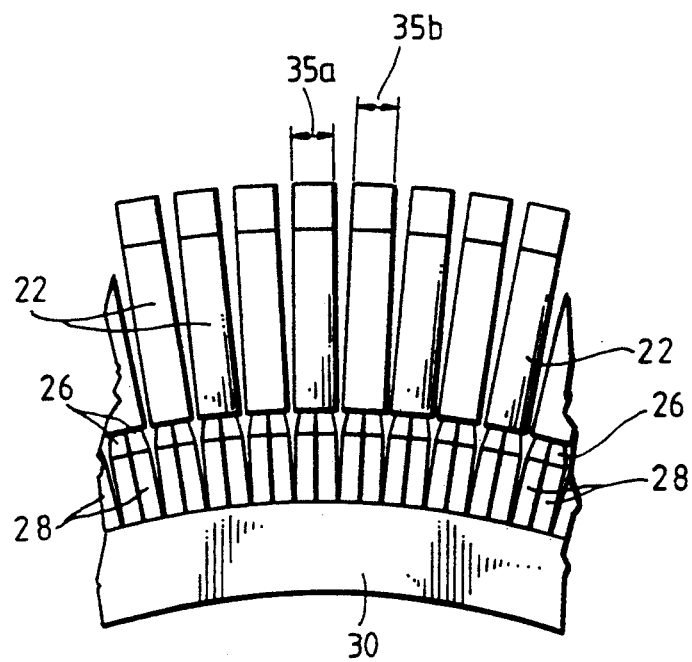
FIG. 3 is an enlarged section of FIG. 2 illustrating the relationship between individual crystals, light guides, photomultiplier tubes and the septum.

Referring to FIG. 2, a cross-section of the present invention illustrating one of the detector planes 14 is displayed, in which a plurality of photo-multiplier tubes 22 are shown providing a ring of detectors consisting of crystals 28 and light guides 26, around the axis 24 of the patient area 16. An enlarged representative section of this illustration is shown in FIG. 3, which details the in-plane relationships of septum 30, crystals 28, light guides 26 and photomultiplier tubes 22, around the ring. Note that, as will be displayed later, alternating modules 35a and 35b about the ring 14 are offset with respect to each other in the axial direction 24, which in this case is into the plane of the page. Also two representative septa 30 are located axially at the bounds of this detector plane.

Figure 4:
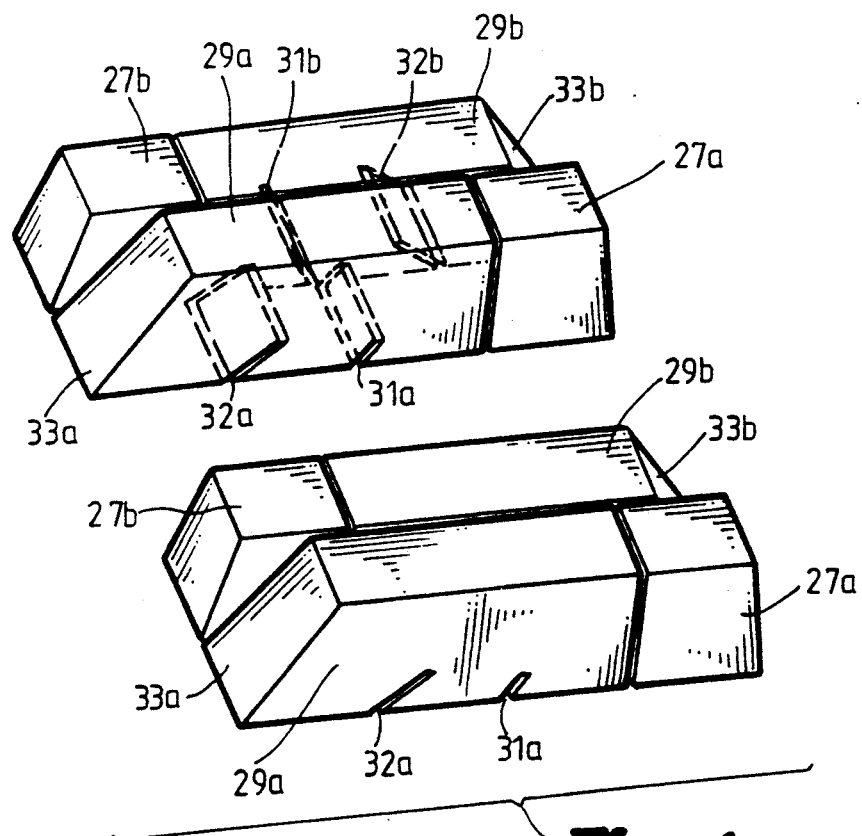
FIG. 4 is an enlarged perspective view of the preferred embodiment of a pair of light guides which mix the light from eight crystals between two photomultiplier tubes to uniquely identify each crystal.
Figure 5:
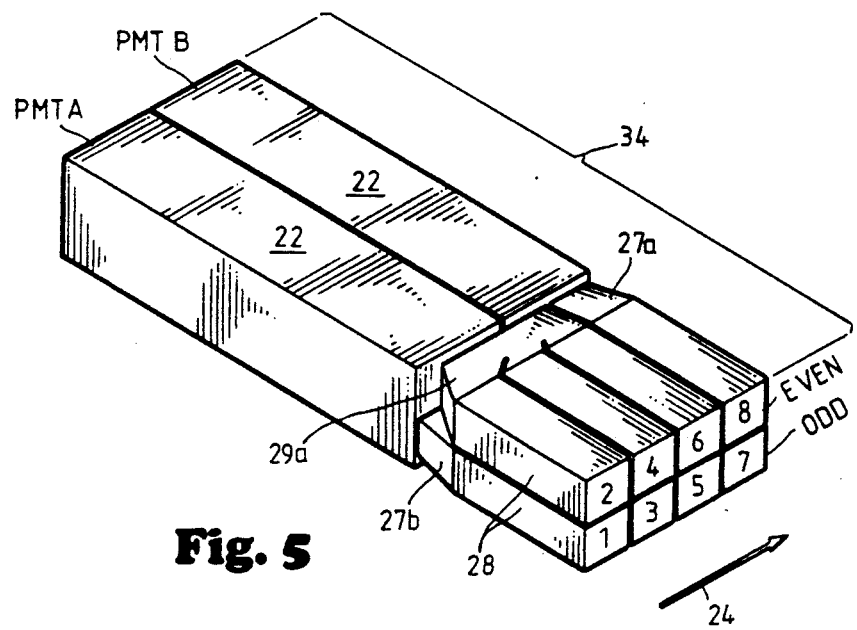
FIG. 5 is a perspective view of the preferred embodiment of one sub-module including two photomultiplier tubes, the set of light guides from FIG. 4, and eight crystals.
Figure 7:
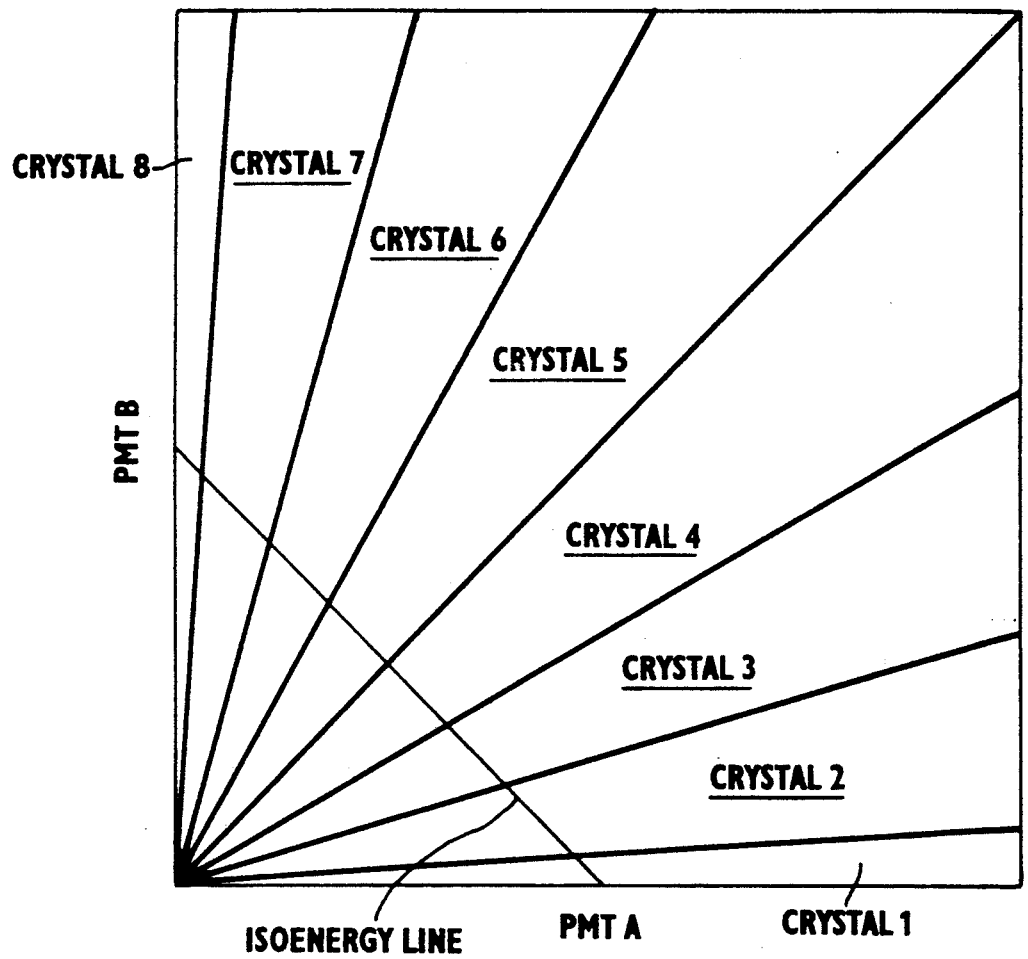
FIG. 7 is an energy distribution map of the crystal identification localization table illustrating how the photomultiplier tubes are used to determine which crystal has been activated by radiation in the preferred embodiment illustrated in FIG. 2 through 6.

Referring now to FIGS. 4, 5 and 7 the details of crystal identification are presented. As seen in FIg. 4, the light guides 26 are made up of two equal but opposite columns of light transferring material, such as uv-transmitting plexiglass or glass, which contain a reflective coating on all but the top and bottom surfaces. In the embodiment shown, eight crystals 28 are identified by the two photomultiplier tubes 22 A and B. The light guides 26 include equal but opposite parts 27a and 29a, and 27b and 29b, respectively. Parts 27a and 29a service and identify the EVEN column of crystals 2, 4, 6, and 8 to the photomultiplier tubes A and B. Parts 27b and 29b service and identify the ODD column of crystals 1, 3, 5, and 7 to the photomultiplier tubes A and B. Each physical column is divided into two parts that cover one (27a, 27b) and three (29a, 29b) crystals respectively. Therefore in this embodiment, the two columns of light guides 26 are designed to service eight crystals 28, structured as two columns of four each, as shown in FIG. 5. Light guide element 27b routes all the light from crystal 1 into a photomultiplier tube A, which defines CRYSTAL-1 in the ODD column as shown in FIG. 5 and in the FIG. 7 energy map. Light guide 27a routes all the light from crystal 8 into photomultiplier tube B, which defines CRYSTAL-8 in the EVEN column as shown in FIG. 5 and in FIG. 7. Light guide elements 29a and 29b perform the more complex function of mixing the light from the three remaining crystals in-column between the two photomultiplier tubes A and B. Thus light guide element 29a includes slanted slots or reflective septa 31a, 32a, and 33a, extending partway therethrough. Slot 31a redirects and masks the light from CRYSTAL-6 partly away from photomultiplier tube A and toward tube B, moving the response further away from the 45-degree midline and maintaining an equal summed vector response to support isoenergy relationships within the energy map as in FIG. 7. Slot 32a redirects and masks the light from CRYSTAL-4 partly away from photomultiplier tube A and toward tube B, moving the response further toward the 45-degree midline and maintaining an equal summed vector response to support isoenergy relationships within the energy map as in FIG. 7. Finally, feature 33a redirects and masks the light from CRYSTAL-2 partly away from photomultiplier tube A and toward tube B, moving the response further toward the 45 degree midline and maintaining an equal summed vector response to support isoenergy relationships within the energy map as in FIG. 7. Similarly, light guide element 29b includes slanted slots or reflective septa 31b, 32b, and 33b partway through for redirecting and masking the light from CRYSTAL-3, CRYSTAL-5 and CRYSTAL-7, respectively, away from photomultiplier tube B and toward tube A. Therefore, CRYSTAL-3, CRYSTAL-5 and CRYSTAL-7 in the ODD column have responses that interleave with the responses of the EVEN column as shown in FIG. 7.

Considering FIG. 5 in more detail, the entire displayed assembly defines the smallest fundamental crystal identification unit or sub-module 34, containing eight crystals 28, two photomultiplier tubes 22 (shown as square tubes A and B rather than round merely as a convenience), and the set of interleaving light guides 26 from FIG. 4. Note that to achieve a more extensive axial field-of-view 20, several such sub-modules 34 must be concatenated in the axial direction 24 to create a major module 35, as shown in FIG. 6, which in this embodiment contains three sub-modules 34.

Figure 6:
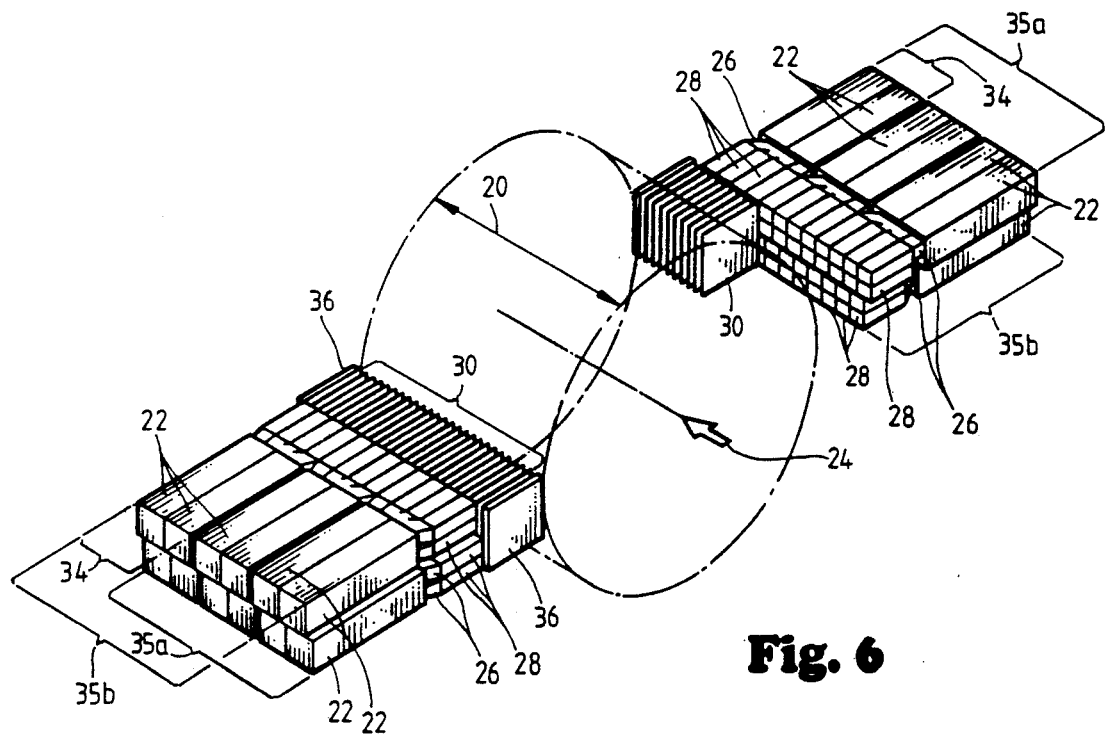
FIG. 6 is a minimized perspective view illustrating two opposing sets of two axially offset (staggered) major modules each containing three sub-modules. The related septa sections are also shown with an area removed from one set of major modules to reveal the crystal placement and stagger.

Referring now primarily to FIG. 6, the key feature of axial offset or stagger between alternating major modules 35a and 35b, is illustrated. Note that septa 30 continue to be placed at every crystal axial edge, which must, due to stagger, also bisect crystals in alternate modules, permitting the reduction of septa length described in U.S. Pat. No. 4,563,582. In this embodiment of the present invention, a total of 47 straight on and cross-slice planes may be obtained, of which 45 slices are routinely usable. At each end of the axial field-of-view 20 the last septum may be thicker 36 than the standard septa 30 which will permit the use of a less dense material if desired (i.e. lead versus tungsten).

In use, the positron emission tomography scanner of the present invention provides a higher axial resolution, increased number of image planes, requires no more photomultiplier tubes to implement, maintains proper data sampling in the axial direction, and improves the count rate performance of the system.

The present invention, therefore is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. In a positron emission tomography scanner having a plurality of detector rings positioned side-by-side around the axis of a patient area to detect radiation from the patient area, each ring containing a plurality of scintillation detectors pointed to the patient area, the improvement in the rings of detectors comprising, each detector ring including a plurality of paired photomultiplier tubes around the circumference, each ring being in a plane perpendicular to said axis, two adjacent, columns of equal size scintillation crystals aligned in the axial direction on each pair of photomultiplier tubes, positioned around each ring for detecting radiation from the patient area for converting the radiation into light which is routed to the photomultiplier tubes, each crystal containing a length in the axial direction which is less than the width of the photomultiplier tube in order to improve the scanner axial resolution, and first and second one dimensional light guides, the first guide positioned between one of two columns of crystals and the paired photomultiplier tubes and the second guide positioned between the other of the two columns and the paired photomultiplier tubes for mixing the light from said two columns of crystals for employing the relative distribution of light to uniquely identify each crystal.

2. The scanner of claim 1 wherein the first and second light guides include first and second equal but opposed parts.

3. In a positron emission tomography scanner having a plurality of detector rings positioned side-by-side around the axis of a patient area to detect radiation from the patient area, each ring containing a plurality of scintillation detectors pointed to the patient area, the improvement in the rings of detectors comprising, each detector ring including two rows of a plurality of photomultiplier tubes around the circumference, each ring being in a plane perpendicular to said axis, two adjacent columns of equal size scintillation crystals aligned in the axial direction to each pair of photomultiplier tubes, positioned around each ring for detecting radiation from the patient area for converting the radiation into light which is routed to the photomultiplier tubes, each crystal containing a length in the axial direction which is less than the width of the photomultiplier tubes, a set of one dimensional light guides positioned between the two columns of crystals and said pair of photomultiplier tubes for employing the relative distribution of light to uniquely identify each crystal, wherein a sub-module includes the pair of photomultiplier tubes, the set of light guides and the two columns of crystals for reducing the area influenced by an individual crystal dead-time and improves the dynamic response of the system, and wherein each alternating sub-module around the ring is offset in the axial direction by one-half or less of the intra-module axial spacing between crystal centers wherein the resultant system axial sampling or slice spacing is less than one-half the axial resolution which is desirable to properly sample the three-dimensional object.

4. The scanner of claim 3, wherein the light set of one dimensional light guides include, first and second one dimensional light guides, the first guide positioned between one of the two columns of crystals and the paired photomultiplier tubes and the second guide positioned between the other of the two columns and the paired photomultiplier tubes for mixing the light from said two columns of crystals for employing the relative distribution of light to uniquely identify each crystal, and wherein the first and second light guides include first and second equal but opposed parts.

* * * * *